(12) United States Patent
Chen et al.

(10) Patent No.: US 12,741,404 B2
(45) Date of Patent: Sep. 22, 2026

(54) CURVED PLASTIC PANEL AND METHOD AND DEVICE FOR PROCESSING THE SAME

(71) Applicant: ENFLEX CORPORATION, Taoyuan City (TW)

(72) Inventors: Hsin Yuan Chen, Taoyuan City (TW); Chih Teng Ku, Taoyuan City (TW); Jui Lin Hsu, Taoyuan City (TW); Chun Kai Wang, Taoyuan City (TW); Yu Ling Chien, Taoyuan City (TW)

(73) Assignee: ENFLEX CORPORATION, Taoyuan City (TW)

( * ) Notice: Subject to any disclaimer, the term of this patent is extended or adjusted under 35 U.S.C. 154(b) by 81 days.

(21) Appl. No.: 18/920,942

(22) Filed: Oct. 20, 2024

(65) Prior Publication Data

US 2025/0042068 A1 Feb. 6, 2025

Related U.S. Application Data

(63) Continuation of application No. 17/874,090, filed on Jul. 26, 2022, now Pat. No. 12,296,513.

(51) Int. Cl.

| | |
|---|---|
| ***B29C 43/52*** | (2006.01) |
| ***B29C 35/02*** | (2006.01) |
| ***B29C 43/04*** | (2006.01) |
| *B29C 43/14* | (2006.01) |
| *B29C 43/36* | (2006.01) |
| *B29C 43/58* | (2006.01) |
| *B29L 7/00* | (2006.01) |

(52) U.S. Cl.

CPC .......... *B29C 43/52* (2013.01); *B29C 35/0288* (2013.01); *B29C 43/04* (2013.01); *B29C 2043/147* (2013.01); *B29C 2043/3615* (2013.01); *B29C 2043/5816* (2013.01); *B29C 2043/5891* (2013.01); *B29L 2007/002* (2013.01)

(58) Field of Classification Search

CPC ..... B29C 35/0288; B29C 43/04; B29C 43/52; B29C 2043/147; B29C 2043/3615; B29C 2043/5891; B29C 2035/0827; B29C 2043/5816; B29L 2007/002

See application file for complete search history.

(56) References Cited

U.S. PATENT DOCUMENTS

2005/0167214 A1* 8/2005 Yamamoto ............ F16D 65/125 188/218 R
2020/0353655 A1* 11/2020 Orchard .................. B29C 43/44

* cited by examiner

*Primary Examiner* — Monica A Huson

(57) ABSTRACT

A method for processing a curved plastic panel is to first form a hard coating layer, an optical function layer, and a printing layer on a flat plastic substrate, and then cut it into a predetermined shape, and then use a hot pressing and curving device to perform a hot pressing and curving process to the flat plastic substrate in order to make it becoming a curved plastic substrate. The hot pressing and curving device can simultaneously perform hot pressing during the heating process, and has the functions of real-time monitoring of the local temperature and the local curvature forming state, and then feedback to the local heating and curvature forming mechanism for adjustments. The monitoring of temperature and curvature can be divided into multiple stages, which can be monitored stage by stage and adjusted for heating or curvature forming to improve production yield.

4 Claims, 10 Drawing Sheets

CURVED PLASTIC PANEL AND METHOD AND DEVICE FOR PROCESSING THE SAME

This application claims the benefit of Taiwan Patent Application Serial No. 110142418 filed Nov. 15, 2021, the subject matter of which is incorporated herein by reference.

BACKGROUND OF INVENTION

1. Field of the Invention

The present invention relates to a curved plastic panel and a processing method and device thereof, especially a processing method and device for firstly providing a hard coating layer and an optical function layer onto a flat plastic substrate and then hot pressing the flat plastic substrate into a curved plastic panel.

2. Description of the Prior Art

Most of the traditional vehicles use glass as the material for the sunroof, the windshield, and the front panel of the vehicle display. Because glass has disadvantages such as heavy in weight, fragile, and difficulty in shaping, some people have developed transparent plastic plates in recent years to replace traditional glass in order to produce the sunroof, the windshield, and the front panel of the vehicle display. Because the vehicle display needs a curved design that is more in streamline with the interior of the car, in recent years, some manufacturers have begun to think of a vehicle display with a curved surface to replace the traditional flat-panel car display. However, one of the biggest difficulties in the product design of the curved vehicle display is the material of the curved panel covering the front of the curved vehicle display and its manufacturing process.

The conventional curved glass panel needs to first process the flat glass plate into curved glass plate by ultra-high temperature thermoforming, and then carry out the surface grinding and polishing of the curved glass plate, and finally carry out optical surface treatments (such as anti-glare or anti-reflection coatings, etc.). However, it is very difficult to control the coating uniformity for optical surface treatments on curved substrates, especially the thickness uniformity of the anti-reflective coating must reach the coating tolerance specification of +/−10 nm, in order to achieve the request of reflectivity of the vehicle front panel <1%. It is quite difficult to achieve this specification in flat panel coating, and it is almost impossible to achieve this on curved panels.

Of course, in recent years, various technologies have also been developed to use plastic materials to make vehicle display panels. There are many types of plastics. Among them, engineering plastics composed of polycarbonate (PC for short) have the advantages of high transparency and free dyeing, high strength and elastic coefficient, high impact strength, wide applicable temperature range, low molding shrinkage, good dimensional stability, good weather resistance, tasteless and odorless, harmless to the human body, fulfilling health and safety requirements, easy to shape, and etc. Therefore, it is more suitable for making transparent substrates with curved surfaces or special structures to replace fragile and unshaped glass plates. However, polycarbonate (PC) also has the disadvantages of being non-abrasive and prone to yellowing under ultraviolet light. Thus, in the prior art, a wear-resistant hard coating layer and an optical function layer are added on the outer surface of the polycarbonate (PC) substrate to improve its wear resistance, UV resistance, anti-glare, and anti-reflect properties.

However, the conventional technologies still encounter a very difficult problem in manufacturing a plastic panel with a curved surface. As shown in FIG. 1, which is a schematic structural diagram of a typical curved plastic panel. Generally speaking, a curved plastic panel suitable for a curved vehicle display includes a plastic substrate, a hard coating layer (HC for short), an optical function layer, and a printing layer in structure. The plastic substrate is usually made of a polycarbonate (PC) layer as the main layer, and at least one polymethyl methacrylate (referred to as PMMA) layer is arranged on the upper and lower surfaces of the PC plate to strengthen the physical properties of the plastic substrate. The hard coating layer is usually formed on the outer surface of the plastic substrate to improve the wear resistance of the plastic panel. The optical function layer is usually formed on the hard coating layer to improve the optical performance of the plastic panel, such as but not limited to: UV resistance, anti-glare, and anti-reflection. The printing layer is usually printed on the inner surface of the plastic substrate to express the functional indicators of the vehicle display.

As shown in FIG. 2, which is a schematic diagram of a conventional processing method of a plastic panel with a curved surface, which includes the following steps:

Step 21: making a flat plastic substrate (commonly known as a raw board) by plastic extrusion molding. This plastic substrate may be a single-layer PC plate, a PMMA/PC double-layer composite plate, or a PMMA/PC/PMMA three-layer composite plate.

Step 22: hot pressing the flat plastic substrate into a curved plastic substrate by means of hot pressing curvature forming.

Step 23: performing HC surface treatment on the plastic substrate having a curved surface, so as to form a hard coating layer on the upper surface of the plastic substrate having the curved surface. However, due to the difficulty of HC surface treatment on curved plastic substrates, the yield rate is not good.

Step 24: performing optical surface treatment on the plastic substrate having the curved surface, so as to form an optical function layer on the hard coating layer of the plastic substrate having the curved surface. However, due to the difficulty of optical surface treatment on curved plastic substrates, the yield rate is not good.

Step 25: performing a printing process on the plastic substrate having the curved surface, so as to form a printing layer on the lower surface of the plastic substrate having the curved surface. However, because the curved plastic substrate is difficult to print, the yield rate is not good.

Step 26: The plastic substrate having the curved surface is processed by a plane computer numerical control (referred to as CNC) processing machine to cut the plastic substrate having the curved surface into a predetermined contour. However, because it is difficult to perform plane CNC machining on curved plastic substrates, the yield rate is not good.

Step 27: Complete the finished plastic panel with a curved surface. Since the defective rate from Step 23 to Step 26 has a cumulative effect, the yield rate of the final finished product is very low, so there is still room for improvement.

As shown in FIG. 3A, FIG. 3B and FIG. 3C, which is a schematic diagram of a conventional method of hot pressing a flat plastic substrate into a plastic substrate with a curved surface. The conventional method of hot pressing the flat plastic substrate 221 into a plastic substrate with a curved surface is to first heat the flat plastic substrate 221 to a predetermined temperature in an oven to soften it, and then move the heated and softened flat plastic substrate to a press molding machine. The press molding machine has upper and lower dies 222, 223 with fixed shape and invariable curvature. Placing the heated flat plastic substrate 221 between the upper and lower dies 222, 223 (as shown in FIG. 3A), and then using the hydraulic cylinder to drive the upper and lower dies 222, 223 to overlap and press the plastic substrate 221*a* located therein (as shown in FIG. 3B), the shape of the plastic substrate 221*a* is thereby deformed into a curved plastic substrate 221*a* that fits with the upper and lower dies, and then the curved plastic substrate 221*a* is taken out (as shown in FIG. 3C). This conventional hot pressing technique not only has the problem of uneven temperature of the plastic substrate 221 due to that the heat dissipates much quicker in the peripheral area than the central area and thus the temperature in the peripheral area is lower than the central area during compression, but also has the problem of stress concentration at the bended portion 229 of the curved plastic substrate 221*a* with a large curvature. Therefore, if the flat plastic substrate with the hard coating layer and the optical function layer formed thereon is hot-pressed using this conventional technique, the hard coating layer will be brittle ruptured and the thickness of the optical function layer will be uneven at the bended portion 229 with a large curvature. As a result, the hot-pressed plastic substrate 221*a* with a curved surface is unusable and cannot pass the product test.

The traditional curvature surface molding of polymer substrates is to first heat the polymer substrate to a temperature higher than the softening point (Tg; glass transition temperature) of the polymer, and then transfer the heated polymer substrate to a hot pressing mold for curvature surface thermoforming. The temperature change of the substrate caused by the thermal convection of the air at room temperature during the transfer process will affect the curvature and contour accuracy of the hot pressing. The longer the transfer time, the longer the cooling time, the less conducive to controlling the temperature uniformity of the substrate, and the worse the control of the curvature and contour accuracy of the hot pressing. Therefore, reducing the transfer time and cooling time is more conducive to the precision control of curvature and contour. The most ideal process design is that high temperature heating and curvature forming are carried out simultaneously in an automated mold. The key point of the present invention is the sensing elements that can monitor the local temperatures and local curvatures in real time, and feed back to the heating mechanism and the hot pressing mechanism, so as to adjust the plate to reach the optimum forming temperature and target curvature in real time.

SUMMARY OF THE INVENTION

The primary objective of the invention is to provide a method for processing a curved plastic panel. The method first forms a hard coating layer, an optical function layer, and a printing layer on a flat plastic substrate, and then uses a CNC machine to cut it into a predetermined shape, and then uses a hot pressing and curving device to perform a hot pressing and curving process to the flat plastic substrate in order to make it becoming a curved plastic substrate. The method of the present invention has the advantages of optical function (anti-reflection or anti-glare) and safety and non-breakage in addition to the production of multifunctional polymer material panels for displays with partially or fully curved surfaces. Moreover, since the processing of the hard coating layer, optical function layer, printing layer and CNC cutting are all carried out on the flat plastic substrate, the yield rate is very high, which overcomes various deficiencies of the prior art.

The second objective of the invention is to provide a device for processing a curved plastic panel. The device includes a hot pressing and curving device which can simultaneously perform hot pressing process during the heating process to the plastic substrate. In addition, the device has the function of real-time monitoring of local temperatures and real-time monitoring of local curvatures forming state, which can be feedback to local heaters and local pressing mechanisms for real-time adjustments of the temperatures and curvatures of different parts of the plastic substrate being processed. The monitoring of temperatures and curvatures can be divided into multiple stages, and the monitoring and adjustment of heating or curvature shaping can be performed stage by stage. Such that, the production yield rate of hot pressing a flat plastic substrate with a hard coating layer, an optical function layer and a printing layer into a curved plastic panel can be improved, while the thermoforming processing of full-curved or partially-curved plastic panels can also be accomplished.

The third objective of the invention is to provide a material composition of the hard coating layer and the optical function layer of the curved plastic panel suitable for the processing method of the present invention. Through the polymer material formulation, coating formulation design and precision coating technology, the ductility properties of polymer surfaces of the plastic substrate having the hard coating layer and the optical function layer can be improved to the level suitable for hot bending, while the original optical and physical properties of the plastic substrate can also be maintained after passing various weather resistance tests.

In order to achieve the aforementioned objectives, the present invention provides a processing method of a curved plastic panel. The processing method comprises the steps of: providing a flat plastic substrate; forming a flat hard coating layer on at least one surface of the flat plastic substrate; forming a flat optical functional layer on the hard coating layer of the flat plastic substrate; forming a flat printing layer on at least one surface of the flat plastic substrate; cutting the flat plastic substrate into a predetermined shape by a cutting machine; and using a hot pressing and curving device to perform a hot pressing and curving processing on the flat plastic substrate having the hard coating layer, the optical function layer and the printing layer formed with the predetermined shape, in order to obtain a curved plastic substrate having the hard coating layer, the optical function layer and the printing layer with the predetermined shape.

Wherein, the hot pressing and curving device comprises: an upper die with variable curvature, a lower die with variable curvature, a plurality of upper heaters, a plurality of upper temperature sensors, a plurality of lower heaters, and a plurality of lower temperature sensors; the plurality of the upper heaters and the plurality of the upper temperature sensors are distributed in each area of the upper die; the plurality of the lower heaters and the plurality of the lower temperature sensors are distributed in each area of the lower die; the upper die and the lower die are matched correspondingly, and curvatures of the upper die and the lower die can be adjusted at least locally; the hot pressing and curving device is used to process the hot pressing and curving process of the flat plastic substrate in the following steps:

adjusting the curvatures of the upper die and the lower die to be flat, and sandwiching the flat plastic substrate between the upper die and the lower die, and using the plurality of the upper heaters and the plurality of the lower heaters to heat the flat plastic substrate to a predetermined temperature, and using the plurality of the upper temperature sensors and the plurality of the lower temperature sensors to sense and monitor the temperature of each area of the flat plastic substrate in order to maintain the temperature of each area of the flat plastic substrate at the predetermined temperature;

adjusting the curvatures of the upper die and the lower die to a first curvature, such that the flat plastic substrate sandwiched between the upper die and the lower die is processed by the upper die and the lower die into the curved plastic substrate with the first curvature; in the meantime, the plurality of the upper temperature sensors and the plurality of the lower temperature sensors continue to sense and monitor that the temperature of each area of the curved plastic substrate with the first curvature is maintained at the predetermined temperature; and adjusting the curvatures of the upper die and the lower die to a second curvature, such that the curved plastic substrate sandwiched between the upper die and the lower die is processed by the upper die and the lower die into the curved plastic substrate with the second curvature; in the meantime, the plurality of the upper temperature sensors and the plurality of the lower temperature sensors continue to sense and monitor that the temperature of each area of the curved plastic substrate with the second curvature is maintained at the predetermined temperature; wherein the second curvature is larger than the first curvature.

In a preferred embodiment, the hot pressing and curving device further comprises a plurality of cameras for capturing curvature images of the upper die and the lower die, in order to determine whether the curvature of the curved plastic substrate has reached a predetermined curvature.

In a preferred embodiment, the upper die at least includes a first upper template, a second upper template and a third upper template; a first upper joint is connected between the first upper template and the second upper template, so that the first upper template can perform a first curvature adjustment movement relative to the second upper template by means of the first upper joint; a second upper joint is connected between the second upper template and the third upper template, so that the third upper template can perform a second curvature adjustment movement relative to the second upper template by means of the second upper joint;

the lower die at least includes a first lower template, a second lower template and a third lower template; a first lower joint is connected between the first lower template and the second lower template, so that the first lower template can perform a third curvature adjustment movement relative to the second lower template by means of the first lower joint; a second lower joint is connected between the second lower template and the third lower template, so that the third lower template can perform a fourth curvature adjustment movement relative to the second lower template by means of the second lower joint;

wherein, the shape and position of the first upper template are corresponding to the first lower template, the shape and position of the second upper template are corresponding to the second lower template, the shape and position of the third upper template are corresponding to the third lower template.

In a preferred embodiment, the plurality of the upper heaters and the plurality of the upper temperature sensors are provided in the first upper template, the second upper template and the third upper template; the plurality of the lower heaters and the plurality of the lower temperature sensors are provided in the first lower template, the second lower template and the third lower template; the first upper joint, the second upper joint, the first lower joint and the second lower joint each includes a linear sliding rail respectively; the curvature between two adjacent said templates is adjusted by a torque driven by the linear sliding rails.

In a preferred embodiment, wherein: a material composition of the flat plastic substrate is one of the following: polymethyl methacrylate (PMMA) plate, Polycarbonate (PC) plate, PMMA/PC double-layer composite plate, or PMMA/PC/PMMA three-layer composite plate; a material composition of the hard coating layer comprises at least one of the following: organic-inorganic hybrid ultraviolet (UV) oligomers/monomers, inorganic particle materials, or UV-curable long-chain oligomers/monomers with high elongation properties (elongation ratio >200%); wherein the organic-inorganic hybrid ultraviolet oligomers/monomers include one of the following: UV-curable elastic oligomer with a high glass transition temperature (Tg), or high Tg monomer; wherein the Tg of the UV-curable elastic oligomer is Tg≥120° C.; wherein the Tg of the high Tg monomer is Tg≥240° C.; the optical function layer is composed of at least one of the following: UV-curable oligomers/monomers with high refractive index (RI), inorganic materials with high RI, UV-curable oligomers/monomers with low RI, or inorganic materials with low RI; wherein, the inorganic materials with high RI contain one of the following: titanium dioxide ($TiO_2$) or niobium pentoxide ($Nb_2O_5$); the inorganic materials with low RI contain one of the following: silicon dioxide ($SiO_2$) or magnesium fluoride ($MgF_2$); the RI value range of the high refractive index UV-curable oligomers/monomers is: RI=1.55~1.75; the RI value range of the low refractive index UV-curable oligomers/monomers is: RI=1.4~1.48; the RI value range of the high RI inorganic material is: RI=1.8~2.5; the RI value range of the low RI inorganic material is: RI=1.2~1.45.

DESCRIPTION OF THE PREFERRED EMBODIMENT

The present invention provides a method for processing a curved plastic panel, which first forms a hard coating layer, an optical function layer, and a printing layer on a flat plastic substrate, and then uses a CNC machine to cut it into a predetermined shape, and then uses a hot pressing and curving device to perform a hot pressing and curving process to the flat plastic substrate in order to make it becoming a curved plastic substrate having the hard coating layer, optical function layer, and printing layer. The method of the present invention has the advantages of optical function (anti-reflection or anti-glare) and safety and non-breakage in addition to the production of multifunctional polymer material panels for displays with partially or fully curved surfaces. Moreover, since the processing of the hard coating layer, optical function layer, printing layer and CNC cutting are all carried out on the flat plastic substrate, the yield rate is very high, which overcomes various deficiencies of the prior art. The hot pressing and curving device of the invention can simultaneously perform hot pressing process during the heating process to the plastic substrate. In addition, the device has the function of real-time monitoring of local temperatures and real-time monitoring of local curvatures forming state, which can be feedback to local heaters and local pressing mechanisms for real-time adjustments of the temperatures and curvatures of different parts of the plastic substrate being processed. The monitoring of temperatures and curvatures can be divided into multiple stages, and the monitoring and adjustment of heating or curvature shaping can be performed stage by stage. Such that, the production yield rate of hot pressing a flat plastic substrate with a hard coating layer, an optical function layer and a printing layer into a curved plastic panel can be improved, while the thermoforming processing of full-curved or partially-curved plastic panels can also be accomplished. The present invention also provides a material composition of the hard coating layer and the optical function layer of the curved plastic panel suitable for the processing method of the present invention. Through the polymer material formulation, coating formulation design and precision coating technology, the ductility properties of polymer surfaces of the plastic substrate having the hard coating layer and the optical function layer can be improved to the level suitable for hot bending, while the original optical and physical properties of the plastic substrate can also be maintained after passing various weather resistance tests.

In order to more clearly describe the curved plastic panel and method and device for processing the same proposed by the present invention, the following embodiments will be illustrated in detail with the drawings.

Figure 1:
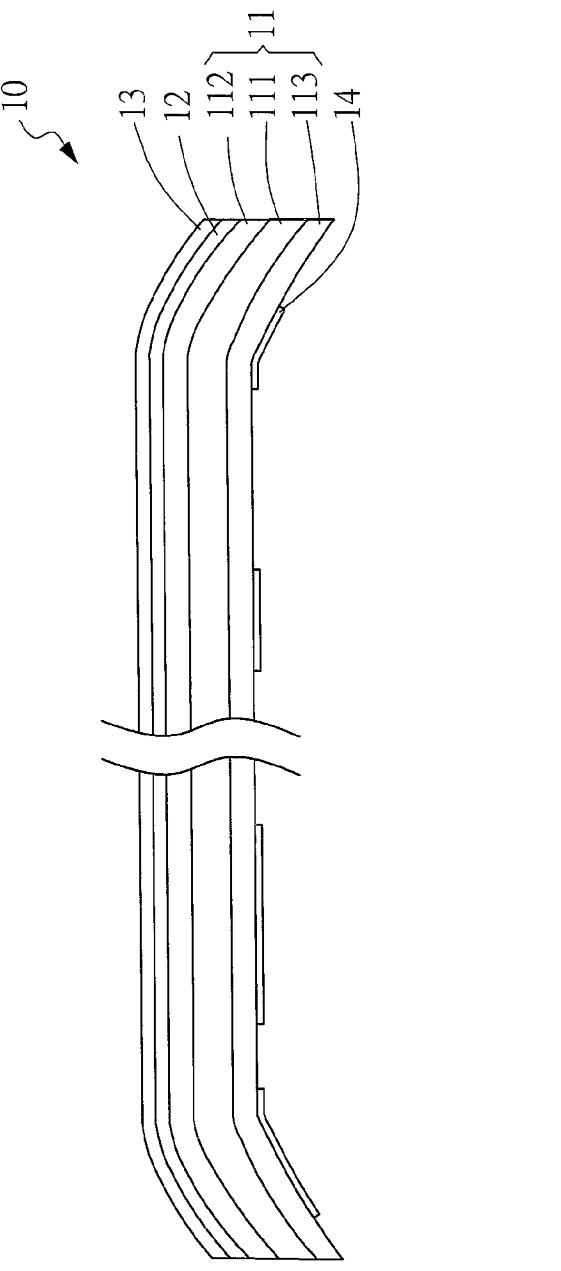
FIG. 1 is a schematic structural diagram of a typical curved plastic panel.
Figure 2:
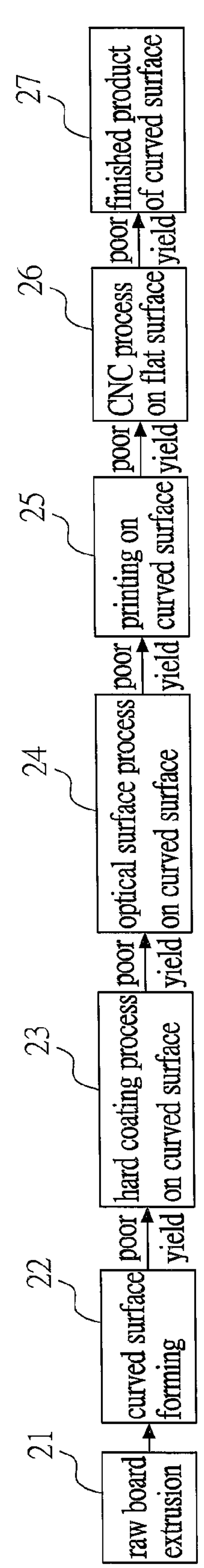
FIG. 2 is a schematic diagram of a conventional processing method of a plastic panel with a curved surface.
Figure 3A:
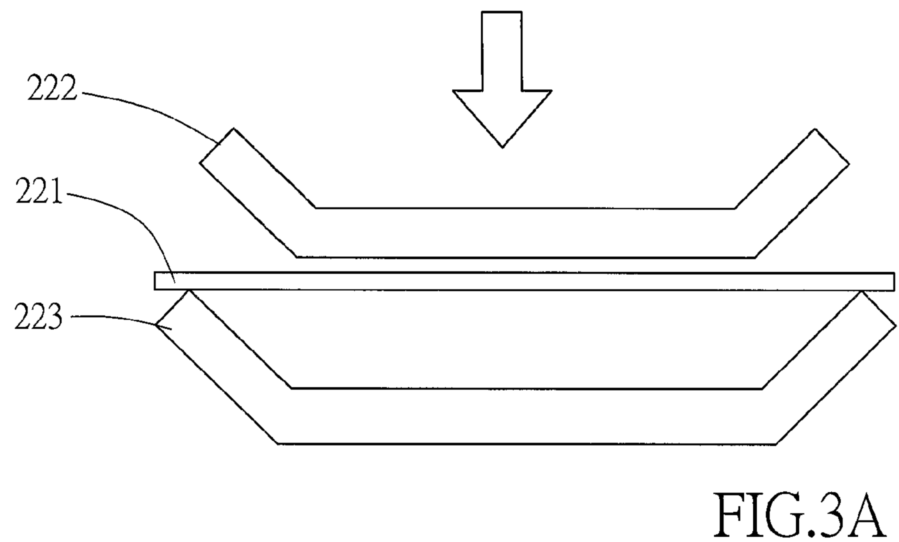
FIG. 3A, FIG. 3B and FIG. 3C are respectively schematic diagrams of three different steps of a conventional method of hot pressing a flat plastic substrate into a plastic substrate with a curved surface.
Figure 3B:
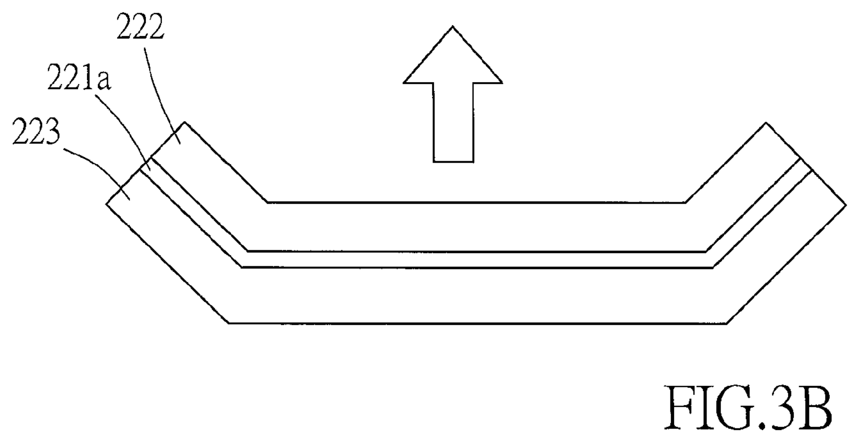
Figure 3C:
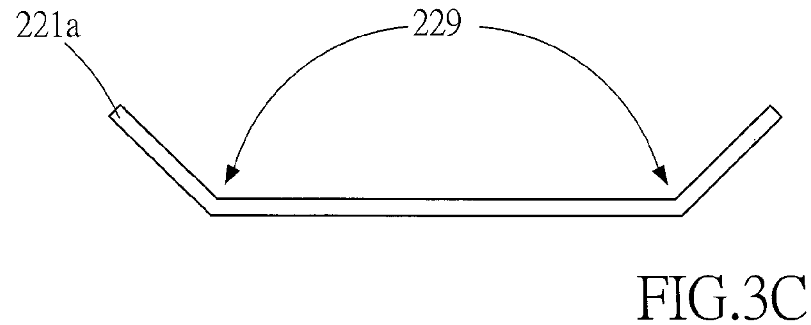

The structure of the curved plastic panel described in the present invention is similar to or the same with the typical plastic panel 10 generally suitable for a curved vehicle display as shown in FIG. 1, which also comprises: a plastic substrate 11, a hard coating (HC for short) layer 12, an optical function layer 13, and a printing layer 14. The plastic substrate 11 can be a single-layer PC plate, a single-layer PMMA plate, a co-extrusion formed PMMA/PC double-layer composite plate, a co-extrusion formed PMMA/PC/PMMA three-layer composite plate, or other conventional plastic plate structures. In this embodiment, the plastic substrate 11 is made of a polycarbonate (PC) layer 111 as the main layer, and two polymethyl methacrylate (PMMA) layers 112, 113 are respectively arranged on the upper and lower surfaces of the PC layer 111 to strengthen its physical properties. The hard coating layer 12 is usually formed on the outer surface (upper surface) of the plastic substrate 11, or the hard coating layer 12 is provided on both the outer and inner surfaces (upper and lower surfaces) of the plastic substrate 11 to improve the wear resistance of the plastic panel 10. In this embodiment, the composition of the hard coating layer 12 includes at least one of the following: organic-inorganic hybrid ultraviolet (UV for short) oligomers/monomers, inorganic particle materials, or UV-curable long-chain oligomers/monomers with high elongation properties (elongation ratio >200%). Wherein, the organic-inorganic hybrid ultraviolet oligomers/monomers include one of the following: UV-curable elastic oligomer with a high glass transition temperature (Tg for short, and its Tg≥120° C.), or high Tg monomer (Tg≥240° C.). The optical function layer 13 is usually formed on the outer surface of the hard coating layer 12 for improving the optical performance of the plastic panel 10, for example but not limited to: UV resistance, anti-glare, and anti-reflection functions. In this embodiment, the optical function layer 13 is composed of at least one of the following: UV-curable oligomers/monomers with high refractive index (RI for short), inorganic materials with high RI, UV-curable oligomers/monomers with low RI, or inorganic materials with low RI. Wherein, the inorganic materials with high RI contain one of the following: titanium dioxide ($TiO_2$) or niobium pentoxide ($Nb_2O_5$). The inorganic materials with low RI contain one of the following: silicon dioxide ($SiO_2$) or magnesium fluoride ($MgF_2$). The printing layer 14 is usually printed on the inner surface of the plastic substrate 11 with colored ink for expressing the functional indicators of the vehicle display. Although the structure of the plastic panel 10 of the present invention is similar to that of the prior art, the present invention is particularly novel in the selection of materials for the hard coating layer 12 and the optical function layer 13 to have high Tg value (Tg≥120° C.) and high elongation characteristics (elongation ratio >200%) material formula. By using the high Tg value (Tg≥120° C.) UV-curable elastic oligomer or high Tg monomer (Tg≥240° C.) material formulation in the hard coating layer 12, a moldable curved plastic panel 10 can be provided with impact resistance, high flexibility, and high temperature stability; it can improve the reliability of high temperature environmental tests or high temperature and high humidity environmental tests. By using the material formulation of UV-curable long-chain oligomers or monomers with high elongation properties (elongation ratio >200%) in the hard coating layer 12, a moldable curved plastic panel 10 with high elongation properties and high temperature formability can be provided, such that, cracks or uneven thickness of the optical function layer 13 can be avoided during the hot pressing process.

In the present invention, the material formulation of the hard coating (HC) layer 12 comprises an organic-inorganic hybrid ultraviolet oligomer. Compared with the traditional high cross-link density HC formula, it has a relatively low cross-link density, and can form a wear-resistant hard coating layer 12 with low shrinkage and good flexibility. Wherein, inorganic materials can contribute to the physical properties of the surface, making the coating to have high hardness and high wear resistance.

In addition, the formulation composition of the hard coating layer 12 of the present invention includes a high Tg ultraviolet photo-elastomer oligomer (such as high Tg UV-curable elastic oligomer) and a high Tg monomer, which has better high temperature stability in comparison with traditional high crosslinking density HC formulations. Therefore, it has better thermos-formability during high temperature process, and can bend the UV-cured formable polymer front panel material to a free curvature. The formulation composition of the hard coating layer 12 of the present invention includes UV-curable long-chain oligomers or monomers with high elongation properties (elongation ratio >200%), which has better high extensibility in comparison with traditional high crosslinking density HC formulations. Therefore, it has better thermos-formability during high temperature process, and can bend the UV-cured formable polymer front panel material to a free curvature. The flat plastic panel 10 with the hard coating layer 12 and the optical function layer 13 of the present invention is subjected to flat ink printing and flat surface CNC machining before hot pressing. Then, combining with the hot pressing and curving process of the present invention, it can directly produce curved surface products with optical function after the hot pressing and curving process. For the conventional curved front panel production process, the curved surface hot pressing is performed first, and then the curved surface treatment and curved surface optical processing, curved surface printing, and curved surface CNC cutting processing are performed; due to the difficult processing of curved surfaces, the yield rate of each station is poor, and the reduction in pass-through rate leads to high production costs. In the other hand, the processing method of the present invention has lower processing cost because each processing technology is completed on a plane, and the yield rate and pass-through rate of each station are high. In this embodiment, the RI value range of the high refractive index (RI) UV-curable oligomers/monomers is: RI=1.55~1.75; the RI value range of the low refractive index (RI) UV-curable oligomers/monomers is: RI=1.4~1.48; the RI value range of the high RI inorganic material is: RI=1.8~2.5; the RI value range of the low RI inorganic material is: RI=1.2~1.45. Anti-reflection is defined as: Reflectance <2%; Anti-glare is defined as: Gloss <100.

Figure 4:
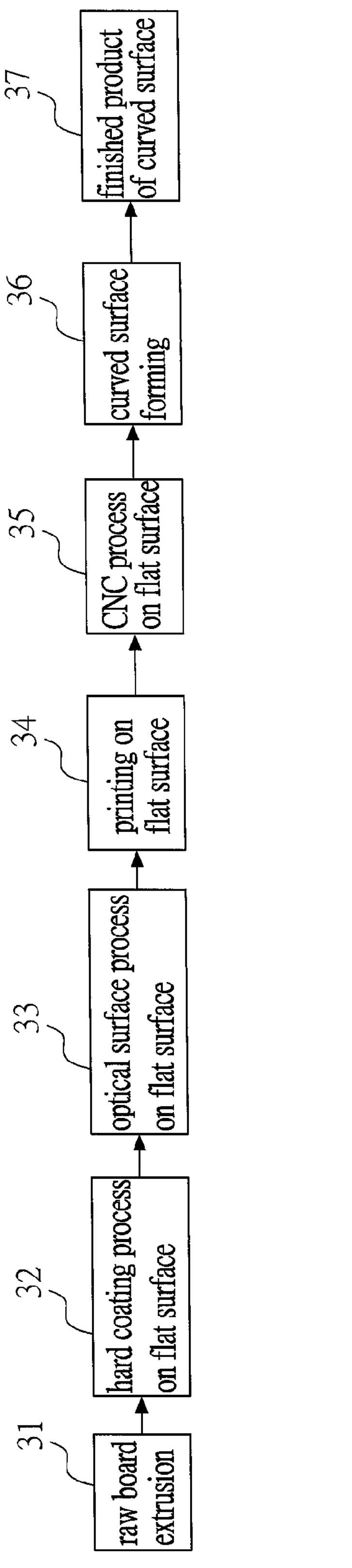
FIG. 4 which is a schematic diagram of the processing method of the curved plastic panel of the present invention.

Please refer to FIG. 4, which is a schematic diagram of the processing method of the curved plastic panel of the present invention, which includes the following steps:

Step 31: making a flat plastic substrate (commonly known as a plastic raw board) by plastic extrusion molding; The flat plastic substrate may be a single-layer PC plate, a single-layer PMMA plate, a PMMA/PC double-layer composite plate, or a PMMA/PC/PMMA three-layer composite plate;

Step 32: performing an HC surface treatment on the flat plastic substrate, so as to form a hard coating layer on the upper surface (outer surface) of the flat plastic substrate; because the flat plastic substrate is easy to carry out the HC surface treatment, the yield rate is very high;

Step 33: performing an optical surface treatment on the flat plastic substrate to form an optical function layer on the hard coating layer of the flat plastic substrate; because the flat plastic substrate is easy to carry out the optical surface treatment, the yield rate is very high;

Step 34: performing a printing process on the flat plastic substrate, so as to form a printing layer on the lower surface (inner surface) of the flat plastic substrate; because the flat plastic substrate is easy to carry out the printing process, the yield rate is very high;

Step 35: the flat plastic substrate is cut with a plane computer numerical control (CNC) processing machine (cutting machine) to cut the flat plastic substrate into a flat plastic substrate with a predetermined contour; because the flat plastic substrate is easy to carry out the CNC cutting process, the yield rate is very high;

Step 36: using a hot pressing and curving device to perform a hot pressing and curving process on the flat plastic substrate which has been cut with the predetermined shape and formed with the hard coating layer, the optical function layer and the printing layer, in order to make it a curved plastic substrate having the hard coating layer, the optical function layer and the printing layer and having the predetermined shape; and Step 37: completing the finished curved plastic panel; since the processing yield rates from steps 32 to 35 are high, the final finished product has high yield rate and precision, and can pass subsequent product testing.

Figure 5A:
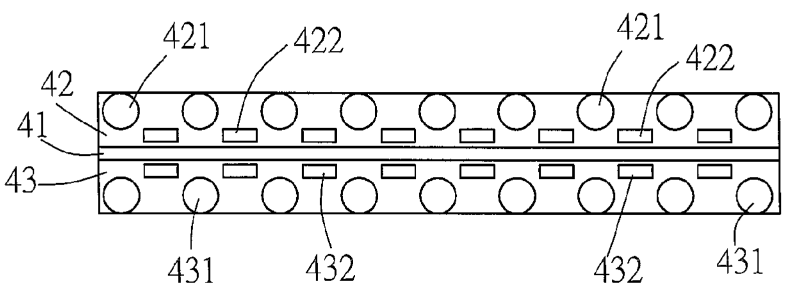
FIG. 5A, FIG. 5B, FIG. 5C, and FIG. 5D are schematic diagrams of several stages for hot pressing and curving a flat plastic substrate into a curved plastic substrate according to the present invention.

As shown in FIG. 5A, FIG. 5B, FIG. 5C, and FIG. 5D, which are schematic diagrams of several stages for hot pressing and curving a flat plastic substrate into a curved plastic substrate according to the present invention. The processing method of the present invention uses a hot pressing and curving device to perform a hot pressing and curving process on the flat plastic substrate which has been cut with the predetermined shape and formed with the hard coating layer, the optical function layer and the printing layer, in order to make it a curved plastic substrate 41 having the hard coating layer, the optical function layer and the printing layer and having the predetermined shape. The hot pressing and curving device comprises: an upper die 42 with a variable curvature, a lower die 43 with a variable curvature, a plurality of upper heaters 421, a plurality of upper temperature sensors 422, and a plurality of lower heaters 431, and a plurality of lower temperature sensors 432. Please refer to FIG. 5E, which is a schematic top view of the upper die (or lower die) of the hot pressing and curving device of the present invention. In this embodiment, a plurality of the upper heaters 421 and a plurality of the upper temperature sensors 422 are evenly and staggeredly distributed in each area of the upper die 42 in an array manner; in addition, a plurality of the lower heaters 431 and a plurality of the lower temperature sensors 432 are also evenly and staggeredly distributed in each area of the lower die 43 in an array manner. The outer contours and structures of the upper die 42 and the lower die 43 are correspondingly matched and their curvatures can be adjusted at least partially. In this embodiment, the hot pressing and curving device performs the hot pressing and curving process on the flat plastic substrate 41 by the following steps:

As shown in FIG. 5A, first, the curvature of the upper die 42 and the lower die 43 is adjusted to a plane (curvature=0); and then, the flat plastic substrate 41 is sandwiched between the upper die 42 and the lower die 43; and then, the temperature of the flat plastic substrate 41 is heated to a predetermined temperature by a plurality of the upper heaters 421 and a plurality of the lower heaters 431, and a plurality of the upper temperature sensors 422 and a plurality of the lower temperature sensors 432 are used to sense, monitor or feedback to control the temperature of each area of the flat plastic substrate 41 is maintained at the predetermined temperature.

Figure 5B:
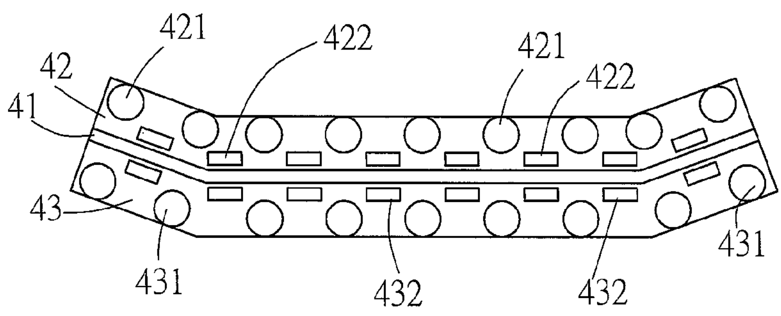

As shown in FIG. 5B, then, the curvatures of the upper die 42 and the lower die 43 are adjusted to a first curvature (relatively small curvature), such that the flat plastic substrate 41 sandwiched between the upper die 42 and the lower die 43 becomes a curved plastic substrate 41 with the first curvature due to hot pressing by the upper die 42 and the lower die 43. In the meantime, the plurality of upper temperature sensors 422 and the plurality of lower temperature sensors 432 continue to sense, monitor and feedback to control that the temperature of each area of the curved plastic substrate 41 with the first curvature is consistently maintained at the predetermined temperature.

Figure 5C:
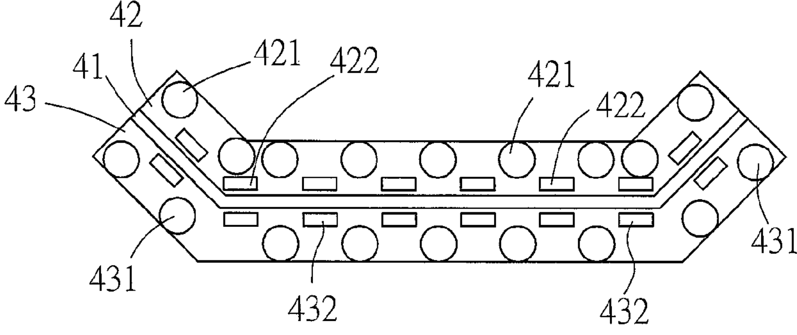

And then, as shown in FIG. 5C, the curvatures of the upper die 42 and the lower die 43 are adjusted to a second curvature (relatively larger curvature), such that the curved plastic substrate 41 sandwiched between the upper die 42 and the lower die 43 becomes a curved plastic substrate 41 with the second curvature due to hot pressing by the upper die 42 and the lower die 43. In the meantime, the plurality of upper temperature sensors 422 and the plurality of lower temperature sensors 432 still continue to sense, monitor and feedback to control that the temperature of each area of the curved plastic substrate 41 with the second curvature is consistently maintained at the predetermined temperature. Wherein, the second curvature is larger than the first curvature.

Figure 5D:
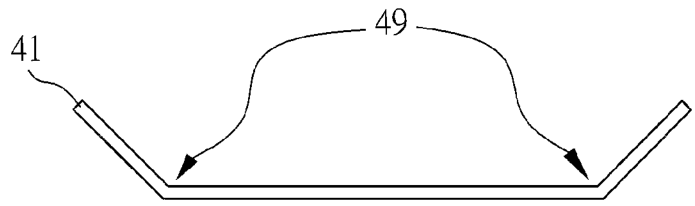
Figure 5E:
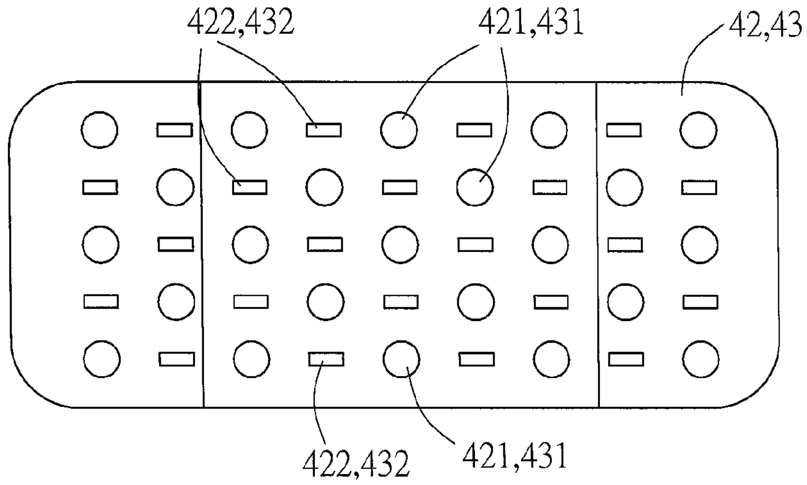
FIG. 5E is a schematic top view of the upper die (or lower die) of the hot pressing and curving device of the present invention.

As shown in FIG. 5D, when the curvature of the curved plastic substrate 41 (i.e., the curvature of the upper die 42 and the lower die 43) reaches a predetermined curvature, the upper and lower dies 42, 43 can be opened in order to take out the curved plastic substrate 41 with the predetermined curvature. Since the hot pressing and curving device of the present invention is provided with a plurality of heaters 421, 431 and temperature sensors 422, 432 on the upper and lower dies 42, 43 respectively to perform heating and temperature control, each heater 421, 431 and the temperature sensors 422 and 432 can operate independently to control the temperature, so the temperature of each area of the plastic substrate 41 is stable and uniform during the hot pressing and curving process. In addition, the hot pressing and curving device can simultaneously perform hot pressing during the heating process, and has the functions of real-time monitoring of local temperature and local curvature forming state and then feedback to the local heating and curving mechanisms for local adjustments. The monitoring of temperatures and curvatures can be divided into multiple stages, and the monitoring and adjustment of heating and curvature shaping can be performed stage by stage; such that, the stress concentration or cracking of the hard coating layer can be avoided at the bended portion 49 of the curved plastic substrate 41, and the production yield rate can be improved. Through the polymer material formulation, coating formulation design and precision coating technology, the ductility properties of polymer surfaces (especially the hard coating layer) of the plastic substrate can be improved to the level suitable for hot bending, while the original optical and physical properties of the hot-pressed and curved plastic substrate can also be maintained after passing various weather resistance tests.

Figure 6:
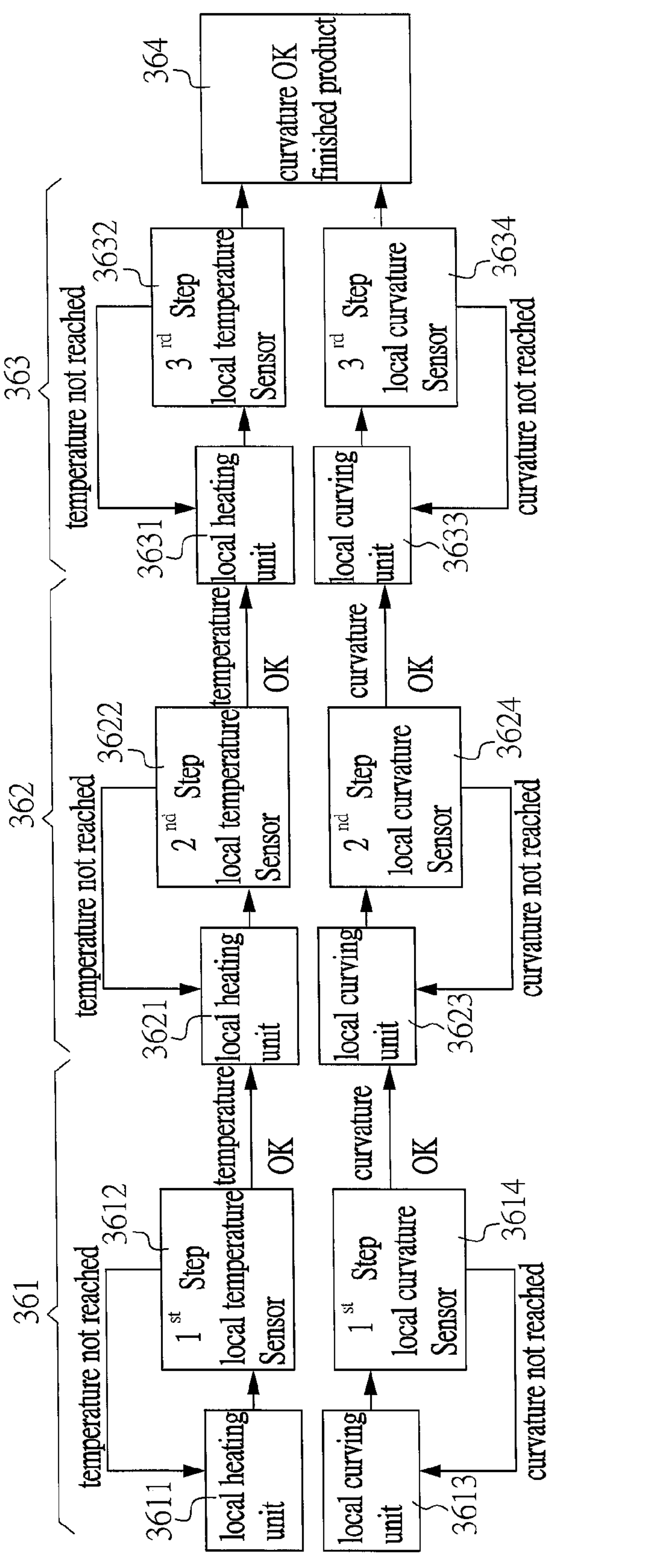
FIG. 6 is a schematic flowchart of the real-time monitoring of local temperature and local curvature forming state of the hot pressing and curving device according to the present invention.

Please refer to FIG. 6, which is a schematic flowchart of the real-time monitoring of local temperature and local curvature forming state of the hot pressing and curving device according to the present invention. As shown in FIG. 6, and referencing FIG. 5A to FIG. 5D; during the hot pressing and curving process, first, in the first step (the $1^{st}$ Step) 361, as shown in FIG. 5A, the upper and lower dies 42, 43 are still in a low temperature and flat (curvature=0) state; at this time, each part of the plastic substrate is locally heated by a plurality of heaters 421 and 431 (step 3611), and each part of the plastic substrate is sensed by a plurality of temperature sensors 422 and 432 for local temperature sensing. If a certain temperature sensor 422, 432 senses that the temperature of any part (area) does not reach the predetermined temperature, the signal of such sensor will be feedback to a control unit in order to control the corresponding heaters 421, 431 to heat that part (area) (step 3612) until all parts of the plastic substrate are heated to reach the predetermined temperature. At the same time, the hot pressing and curving device also uses the curvature sensors to monitor the curvature of each local position of the upper and lower dies 42 and 43 in real time (step 3613). If it is detected that the curvature of any part (area) does not reach the first curvature, the signal of such detection will be feedback to the control unit in order to control the corresponding upper and lower dies 42 and 43 to perform local bending of that part (area) (step 3614) until all parts of the plastic substrate are bent and curved to reach the first curvature. Then, it will enter the second step (the $2^{nd}$ Step) 362; at this time, as shown in FIG. 5B, the upper and lower dies 42, 43 have been maintained at a predetermined temperature and have a relatively small first curvature. At this time, the plurality of heaters 421 and 431 continue to locally heat each part of the plastic substrate (step 3621), and the plurality of temperature sensors 422 and 432 continue to locally sense the temperature of each part of the plastic substrate. If a certain temperature sensor 422, 432 senses that the temperature of any part (area) does not reach the predetermined temperature, the signal of such sensor will be feedback to the control unit in order to control the corresponding heaters 421, 431 to heat that part (area) (step 3622) until all parts of the plastic substrate are heated to maintain at the predetermined temperature. At the same time, the hot pressing and curving device also keep using the curvature sensors to monitor the curvature of each local position of the upper and lower dies 42 and 43 in real time (step 3623). If it is detected that the curvature of any part (area) does not reach the second curvature, the signal of such detection will be feedback to the control unit in order to control the corresponding upper and lower dies 42 and 43 to perform local bending of that part (area) (step 3624) until all parts of the plastic substrate are bent and curved to reach the second curvature. Wherein, the second curvature is larger than the first curvature. Then, it will enter the third step (the $3^{rd}$ Step) 363; at this time, as shown in FIG. 5C, the upper and lower dies 42, 43 have been maintained at a predetermined temperature and have a relatively larger second curvature. At this time, the plurality of heaters 421 and 431 continue to locally heat each part of the plastic substrate (step 3631), and the plurality of temperature sensors 422 and 432 continue to locally sense the temperature of each part of the plastic substrate. If a certain temperature sensor 422, 432 senses that the temperature of any part (area) does not reach the predetermined temperature, the signal of such sensor will be feedback to the control unit in order to control the corresponding heaters 421, 431 to heat that part (area) (step 3632) until all parts of the plastic substrate are heated to maintain at the predetermined temperature. At the same time, the hot pressing and curving device also keep using the curvature sensors to monitor the curvature of each local position of the upper and lower dies 42 and 43 in real time (step 3633). If it is detected that the curvature of any part (area) does not reach the predetermined curvature, the signal of such detection will be feedback to the control unit in order to control the corresponding upper and lower dies 42 and 43 to perform local bending of that part (area) (step 3634) until all parts of the plastic substrate are bent and curved to reach the predetermined curvature. Wherein, the predetermined curvature is larger than the second curvature. Finally, a finished curved plastic panel with the predetermined curvature can be obtained (the $4^{th}$ Step 364).

Figure 7A:
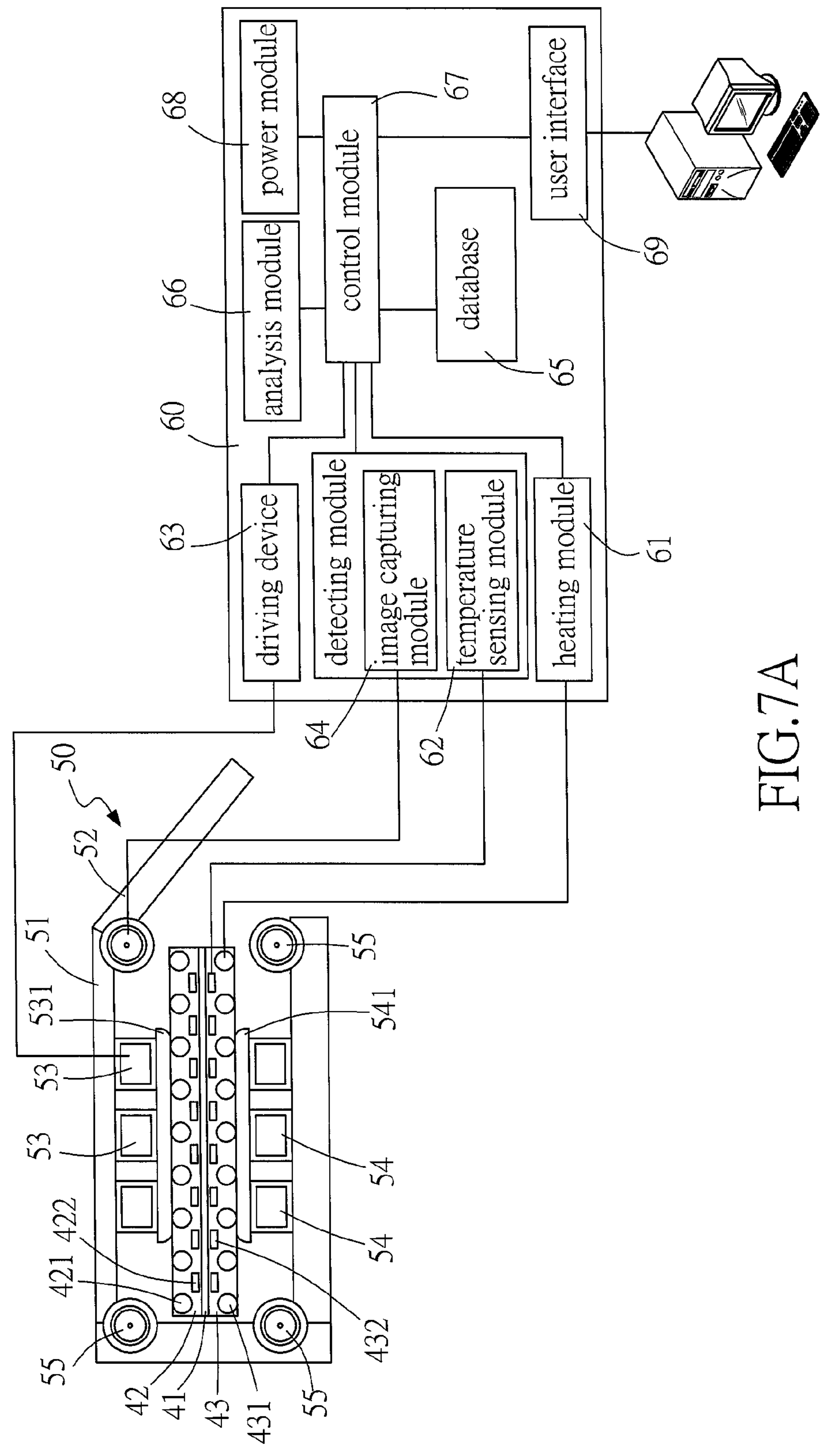
FIG. 7A and FIG. 7B are schematic diagrams of an embodiment of the processing device for a curved plastic panel of the present invention in the states of the door being opened and the door being closed, respectively.
Figure 7B:
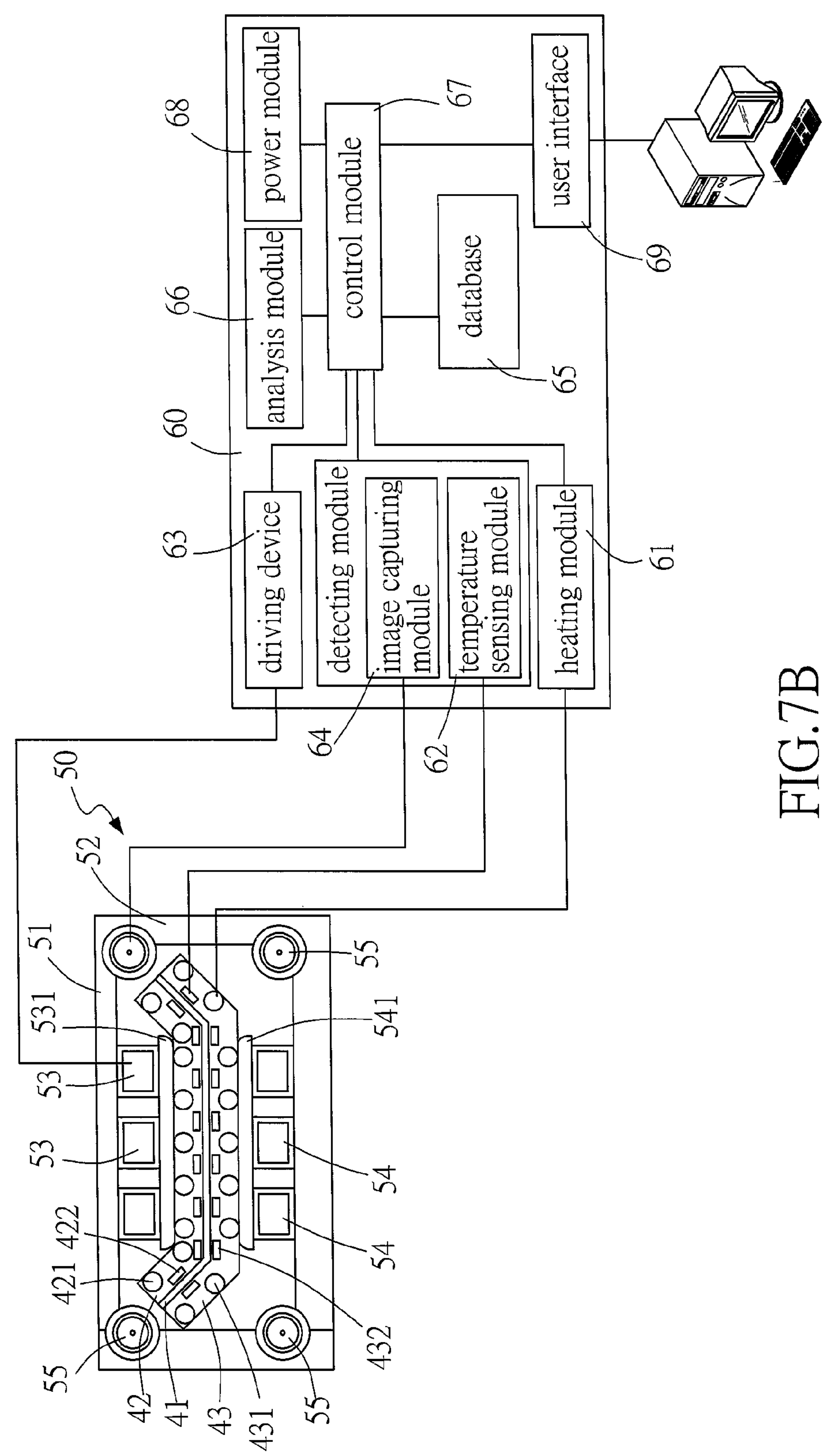

Please refer to FIG. 7A and FIG. 7B, which are schematic diagrams of an embodiment of the processing device for a curved plastic panel of the present invention in the states of the door being opened and the door being closed, respectively. In this embodiment, the processing device of the curved plastic panel of the present invention includes the hot pressing and curving device. In the hot pressing and curving device 50 shown in FIG. 7A and FIG. 7B, in addition to the aforementioned upper die 42 with variable curvature, lower die 43 with variable curvature, a plurality of upper heaters 421, a plurality of upper temperature sensors 422, a plurality of lower heaters 431, and a plurality of lower temperature sensors 432, the hot pressing and curving device 50 further comprises the following components: a machine body 51, a door 52 that can be opened and closed, a plurality of hydraulic devices 53 and 54, a plurality of cameras 55, and a control unit 60. The control unit 60 further comprises: a heating module 61, a detecting module (including a temperature sensing module 62 and an image capturing module 64), a driving device 63, a database 65, an analysis module 66, a control module 67, a power module 68 and a user interface 69.

In this embodiment, the door 52 is installed on the machine body 51. When the door 52 is opened (as shown in FIG. 7A), the flat plastic substrate 41 to be hot-pressed can be placed between the upper and lower die 42 and 43 in the machine body 51, or, the processed curved plastic substrate 41 can be taken out of the machine body 51 from between the upper and lower dies 42 and 43. When the door 52 is closed (as shown in FIG. 7B), the hot pressing and curving processing of the plastic substrate 41 can be performed. The upper and lower dies 42, 43 are respectively combined with a plurality of hydraulic devices 53, 54 by mold locking mechanisms 531, 541. The hydraulic devices 53 and 54 are actuated by the driving device 63 to provide pushing and pulling forces to the upper and lower dies 42 and 43, which are used to drive the upper and lower dies to exert pressure or locally bend (change the curvature), in order to perform the hot pressing and curving process on the plastic substrate 41 sandwiched between the upper and lower dies 42 and 43.

The plurality of cameras 55 constitute the curvature sensors, which can capture (photograph) the curvature (appearance) images of the upper and lower dies 42 and 43 in real time during the hot pressing and curving process. By analyzing the curvature (appearance) images of the upper and lower dies 42 and 43, the curving state of the plastic substrate 41 sandwiched between the upper and lower dies 42 and 43 at that time, that is, the curvature state, can be obtained; and then, it can be determined immediately that whether the curvature of the curved plastic substrate 41 has reached the predetermined curvature or not.

The heating module 61 is electrically connected to the upper heaters 421 and lower heaters 431 for controlling the heating operation of the upper heaters 421 and the lower heaters 431. The detecting module further includes a temperature sensing module 62 and an image capturing module 64. The temperature sensing module 62 is electrically connected to a plurality of the upper temperature sensors 422 and a plurality of the lower temperature sensors 432 for obtaining sensed temperature information from the upper temperature sensors 422 and the lower temperature sensors 432. The image capturing module 64 is electrically connected to the plurality of cameras 55 for capturing/receiving the curvature (appearance) images of the upper die 42 and the lower die 43 captured by the plurality of cameras 55. The database 65 stores the computer software and related parameters required to control the operation of the hot pressing and curving device 50, and also includes the data of the predetermined temperature, the first curvature, the second curvature and the predetermined curvature.

The analysis module 66 can receive the temperature information and the curvature images from the detecting module, and can retrieve the data of the predetermined temperature and the first, second and predetermined curvatures from the database 65. The analysis module 66 can compare the temperature information with the predetermined temperature; when the temperature of the temperature information is lower than the predetermined temperature, the analysis module 66 generates a heating signal to the heating module 61 to actuate the heating module 61 to control a plurality of the upper heaters 421 and a plurality of the lower heaters 431 to heat the plastic substrate 41. The heating operations described here may be global or localized heating. In other words, according to the heating signal from the analysis module 66, the heating module 61 can not only control all the heaters to heat the plastic substrate 41 comprehensively, on the other hand, the heating module 61 can of course only controls some of the heaters to locally heat the plastic substrate 41 according to the heating signal from the analysis module 66, such feature is uniquely created by the present invention and cannot be achieved by conventional technologies. Besides, the analysis module 66 can also compare the curvature images with the predetermined curvature; when the curvature of the curvature image is smaller than the predetermined curvature, the analysis module 66 generates a curvature increase signal to the driving device 63, so that the driving device 63 drives the hydraulic devices 53 and 54 to drive the upper die 42 and the lower die 43 to perform a hot pressing operation that can increase the bending curvature globally or locally. The user interface 69 can allow the user to operate the hot pressing and curving device 50 and also allow the user to input or set-up various information such as the predetermined temperature and the predetermined curvature in the database 65. In this embodiment, the user interface 69 includes a transmission port for connecting with an external computer device. The user can transmit the predetermined temperature, the predetermined curvature and other processing parameters through the user interface 69 and store them in the database 65 by operating the computer device. In another embodiment, the user interface 69 may also include a touch screen and/or a keyboard. The user can set-up the predetermined temperature, the predetermined curvature and other processing parameters in the database 65 by operating the touch screen and/or the keyboard. The control module 67 includes a micro-controller unit (MCU) or a central processing unit (CPU), which is electrically connected to and controls the operations of the driving device 63, the heating module 61, the detecting module, the database 65, the analysis module 66 and the user interface 69. The power module 68 is connected to the control module 67 for providing power to the control unit 60.

Figure 8A:
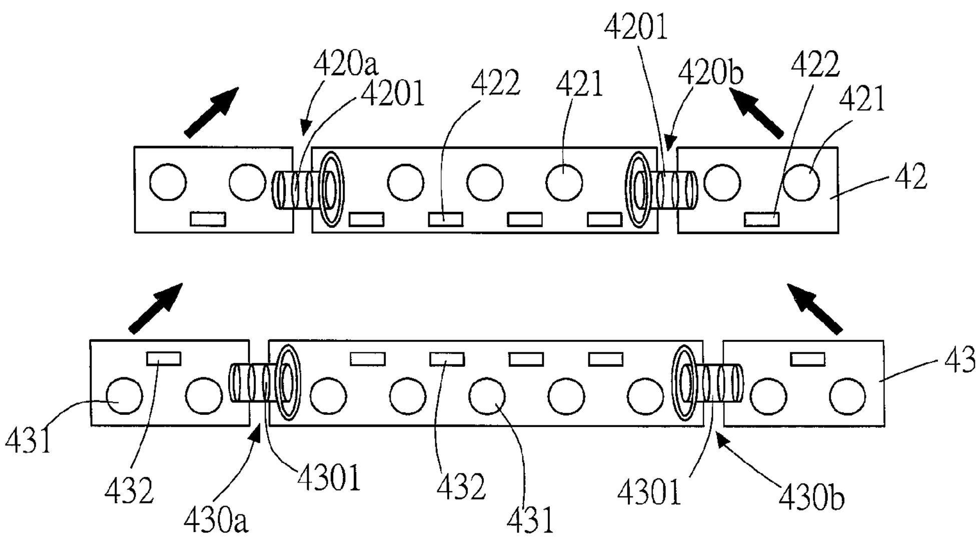
FIG. 8A and FIG. 8B are schematic diagrams of the upper and lower dies with variable curvature of the hot pressing and curving device in the planar state and the bent state, respectively.
Figure 8B:
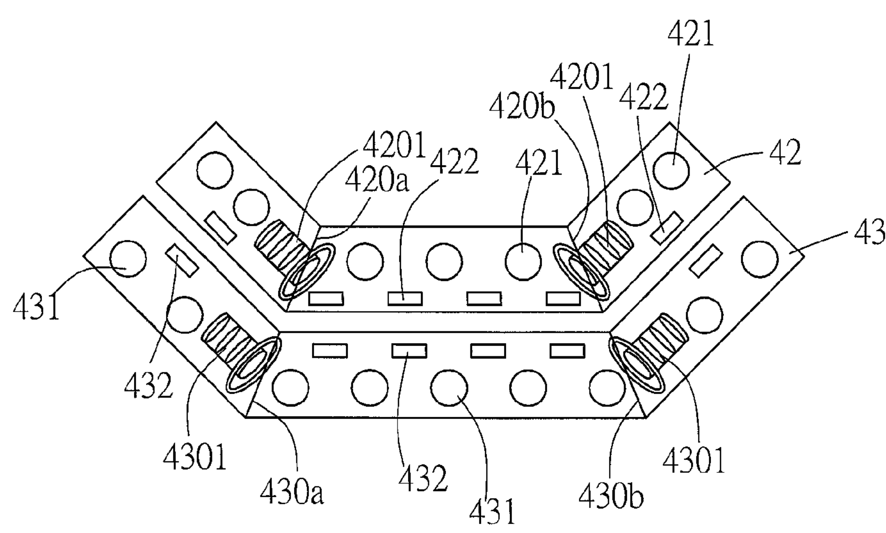

Please refer to FIG. 8A and FIG. 8B, which are schematic diagrams of the upper and lower dies with variable curvature of the hot pressing and curving device in the planar state and the bent state, respectively. In the present invention, both the upper and lower die 42 and 43 of the hot pressing and curving device 50 have variable curvatures. In addition, the specific inner structure of the upper and lower dies 42, 43 need to be designed according to the curved figure of the curved plastic panel to be produced; and, the purpose of bending the upper and lower dies 42, 43 is achieved by the relative torque driven by the linear sliding rails. In one embodiment, the upper die 42 at least includes a first upper template on the left, a second upper template in the middle, and a third upper template on the right. A first upper joint 420*a* is connected between the first upper template and the second upper template, so that the first upper template can perform a curvature adjustment movement relative to the second upper template by means of the first upper joint 420*a*. A second upper joint 420*b* is connected between the second upper template and the third upper template, so that the third upper template can perform a curvature adjustment movement relative to the second upper template by means of the second upper joint 420*b*. Similarly, the lower die 43 at least includes a first lower template on the left, a second lower template in the middle, and a third lower template on the right. A first lower joint 430*a* is connected between the first lower template and the second lower template, so that the first lower template can perform a curvature adjustment movement relative to the second lower template by means of the first lower joint 430*a*. A second lower joint 430*b* is connected between the second lower template and the third lower template, so that the third lower template can perform a curvature adjustment movement relative to the second lower template by means of the second lower joint 430*b*. Wherein, the shape and position of the first upper template are corresponding to the first lower template, the shape and position of the second upper template are corresponding to the second lower template, the shape and position of the third upper template are corresponding to the third lower template. A plurality of the upper heaters 421 and a plurality of the upper temperature sensors 422 are provided in the first upper template, the second upper template and the third upper template. A plurality of the lower heaters 431 and a plurality of the lower temperature sensors 432 are provided in the first lower template, the second lower template and the third lower template. The first upper joint 420*a*, the second upper joint 420*b*, the first lower joint 430*a* and the second lower joint 430*b* each includes a linear sliding rail 4201, 4301 respectively. The bending curvature between the two adjacent templates is adjusted by the torque driven by the linear sliding rails 4201 and 4301.

This technology uses PMMA/PC/PMMA or PMMA/PC composite material as the base material, and uses the wet coating process of the extensible coating formulation to produce the extensible composite material front panel. The hot pressing and curving process is performed only after all surface treatments are completed, and moreover, all surface treatments will not endure any appearance and functional abnormalities at this stage of the hot pressing and curving process. The key to the breakthrough of this process lies in the matching of extensible coating formulations. Extensible coating formulations include: extensible high hardness coating, extensible high refractive index coating, and extensible low refractive index coating. The formula of extensible coating can change the process that the glass used in the old conventional technology must be hot-pressed to form the curved surface first and then subjected to optical surface treatments next, which greatly reduces the defect rate of the curved surface coating process. The surface hardness of the front plastic panel with the extensible composite material after hot pressing and curving process can be increased to more than 4H (4H~9H); the chemical wear resistance test can pass the vehicle standard level; UV yellowing resistance test (1000 hours) can maintain the specification of $\Delta E<3$.

The Applicant tested a variety of plastic substrates with different structures with different hard coating and optical function layers composed of different materials. The following Table 1 shows the structural information of each sample tested. For example, the substrate of Sample 6 in Table 1 selects A3/A4 structure in column A, that is, either "PMMA/PC double-layer plate structure" or "PMMA/PC/PMMA three-layer plate structure" is selected. In column B for Sample 6, whether there is "Inorganic hybrid composition" (organic-inorganic hybrid oligomer/monomer) added to the hard coating layer is to choose B2, that is, Sample 6 is added "with" Inorganic hybrid composition. In column C for Sample 6, whether there is added "High Tg composition" (high glass transition temperature oligomer/monomer) in the hard coating layer is to choose C2, that is, Sample 6 is added "with" High Tg composition. In column D for Sample 6, whether there is "High Elongation Composition" (high elongation oligomer/monomer) added to the hard coating layer is to choose D2, that is, Sample 6 is added "with" High Elongation Composition (oligomer/monomer). In column E for Sample 6, whether to add "Optical Function Composition" (optical function component) to its optical function layer is to choose E2, that is, Sample 6 is added "with" Optical Function Composition. In column F for Sample 6, whether the "new mold and hot pressing and curving process" of the present invention being applied is to select F2, that is, Sample 6 is applied "with" the new mold and hot pressing and curving process of the present invention. The structure of other samples (Samples 0~5, and 7~9) can be learned in the same way, so it is not repeated here.

TABLE 1 the structural information of each sample tested

| Sample No. | Component<br>A: Polymer material selection<br>A1: PC<br>A2: PMMA<br>A3: PMMA/PC<br>A4: PMMA/PC/PMMA | B: Inorganic hybrid composition<br>B1: Without<br>B2: With | C: High Tg Composition<br>C1: Without<br>C2: With | D: High Elongation Composition<br>D1: Without<br>D2: With | E: Optical Function Composition<br>E1: Without<br>E2: With | F: new mold and hot pressing and curving process<br>F1: Without<br>F2: With | Remark |
|---|---|---|---|---|---|---|---|
| Sample 0 | A1~A4 | — | — | — | — | F1 | Poor molding, Surface scratches after molding |
| Sample 1 | A1~A4 | — | — | — | — | F2 | Molding OK, Surface scratches after molding |

TABLE 1-continued the structural information of each sample tested

| Sample No. | Component | | | | | | |
|---|---|---|---|---|---|---|---|
| | A: Polymer material selection A1: PC A2: PMMA A3: PMMA/PC A4: PMMA/PC/PMMA | B: Inorganic hybrid composition B1: Without B2: With | C: High Tg Composition C1: Without C2: With | D: High Elongation Composition D1: Without D2: With | E: Optical Function Composition E1: Without E2: With | F: new mold and hot pressing and curving process F1: Without F2: With | Remark |
| Sample 2 | A3/A4 | B2 | C2 | D1 | E2 | F2 | With optical function, Easy to crack at bent area |
| Sample 3 | A3/A4 | B2 | C1 | D2 | E2 | F2 | With optical function, Appearance defects during heating |
| Sample 4 | A3/A4 | B1 | C2 | D2 | E2 | F2 | With optical function, Insufficient hardness and poor scratch resistance |
| Sample 5 | A3/A4 | B2 | C2 | D2 | E1 | F2 | Hardness, heat resistance, and molding are OK, Without optical function |
| Sample 6 | A3/A4 | B2 | C2 | D2 | E2 | F2 | Hardness, heat resistance, and molding are OK, With optical function |
| Sample 7 | A1 | B2 | C2 | D2 | E2 | F2 | Heat resistance, and molding OK, Poor hardness and yellowing resistance |
| Sample 8 | A2 | B2 | C2 | D2 | E2 | F2 | Hardness, and molding OK, Poor heat and impact resistance |
| Sample 9 | A3/A4 | B2 | C2 | D2 | E2 | F1 | Poor molding, Poor yield rate |

It can be seen from Table 1 that, the curved plastic panel of Sample 6 has OK hardness, heat resistance, and molding, and has optical functions, which is a relatively optimal curved plastic panel sample. Relatively, other samples 0~5, 8, and 9 are more or less including some deficiencies.

In this embodiment, the material compositions described in each column A to E can be selected from currently commercially available commodities. For example, the "Inorganic hybrid composition" described in the column B can be selected from Allenx EBECRYL 8311 or other products of the same type or brand. The "High Tg composition" described in column C can be selected from Allenx EBECRYL 4859 or similar products of other models or brands. The "High Elongation Composition" described in column D can be selected from Allenx EBECRYL 8804 or similar products of other models or brands. The "Optical Function Composition" described in column E can be selected from Nippon Shokubai ZIRCOSTAR series products or products of the same nature of other models or brands.

TABLE 2

The test results of each sample of the curved plastic panel

| Sample No. | Tested item | | | | | | | | | | | |
|---|---|---|---|---|---|---|---|---|---|---|---|---|
| | Pencil hardness/ 750 g | Surface wear resistance | Ball impact resistance (cm)/ 375 g | UVB Weather resistance | High temperature heat resistance | HC stretch formability | Optical properties | External curvature formability | Yield rate of mass production | QUV 1000 hrs Environmental test results (ΔE) | 105° C. 1000 hrs Environmental test results | 85° C., 85% RH 1000 hrs Environmental test results |
| Sample 0 | ≤H | X | — | — | X | — | — | NG | <10% | >3 | X | X |
| Sample 1 | ≤H | X | — | — | X | — | — | OK | <10% | >3 | X | X |

TABLE 2-continued

The test results of each sample of the curved plastic panel

| Sample No. | Tested item | | | | | | | | | | | |
|---|---|---|---|---|---|---|---|---|---|---|---|---|
| | Pencil hardness/ 750 g | Surface wear resis- tance | Ball impact resis- tance (cm)/ 375 g | UVB Weather resis- tance | High temper- ature heat resis- tance | HC stretch form- ability | Optical properties | External curvature form- ability | Yield rate of mass production | QUV 1000 hrs Environ- mental test results (ΔE) | 105° C. 1000 hrs Environ- mental test results | 85° C., 85% RH 1000 hrs Environ- mental test results |
| Sample 2 | ≥3H | ◎ | ◎ | ◎ | ◎ | X | ◎ | OK | 40% | <2 | ◎ | ◎ |
| Sample 3 | ≥3H | ◎ | ◎ | ◎ | X | ◎ | ◎ | OK | 60% | <2 | ◎ | Δ |
| Sample 4 | H | Δ | ◎ | Δ | ◎ | ◎ | ◎ | OK | 80% | <2 | ◎ | Δ |
| Sample 5 | ≥3H | ◎ | ◎ | ◎ | ◎ | ◎ | — | OK | >90% | <2 | ◎ | ◎ |
| Sample 6 | ≥3H | ◎ | ◎ | ◎ | ◎ | ◎ | ◎ | OK | >90% | <2 | ◎ | ◎ |
| Sample 7 | HB | ○ | ◎ | X | ◎ | ◎ | ◎ | OK | 20% | >10 | ◎ | ◎ |
| Sample 8 | H | ◎ | X | ◎ | ○ | ◎ | ◎ | OK | 20% | <1 | X | X |
| Sample 9 | ≥3H | ◎ | ◎ | ◎ | ◎ | ◎ | ◎ | NG | 30% | <2 | ◎ | ◎ |

◎: Excellent
○: Good
Δ: Normal
X: Fail
NG: Not Good

It can be seen from the testing results of the samples of curved plastic panel listed in the Table 2 that, because Sample 6 uses PC/PMMA or PMMA/PC/PMMA composite plate as the plastic substrate, and is provided with the hard coating layer containing organic-inorganic hybrid oligomer/monomer with high Tg and high elongation properties and the optical function layer, and is processed by using the new mold and hot pressing and curving process of the present invention; that is, Sample 6 is similar to the embodiment shown in FIG. 4, FIGS. 5A~5C and FIG. 6; therefore, Sample 6 can obtain excellent or pretty good performances in all tests. In contrast, the other samples (Samples 0~5, 7 and 8) performed more or less poorly in some of the test items. It can be proved that, compared with the prior art, the curved plastic panel produced by the processing method of the present invention can indeed obtain better test results.

While the present invention has been particularly shown and described with reference to a preferred embodiment, it will be understood by those skilled in the art that various changes in form and detail may be without departing from the spirit and scope of the present invention.

What is claimed is:

1. A processing device of a curved plastic panel, comprising a hot pressing and curving device; wherein the hot pressing and curving device comprises:

an upper die with variable curvature, said upper die has a plurality of areas;

a lower die with variable curvature, said lower die has a plurality of areas;

a plurality of upper heaters;

a plurality of upper temperature sensors;

a plurality of lower heaters; and a plurality of lower temperature sensors;

wherein, the plurality of the upper heaters and the plurality of the upper temperature sensors are distributed in each area of the upper die; the plurality of the lower heaters and the plurality of the lower temperature sensors are distributed in each area of the lower die; the upper die and the lower die are matched correspondingly, and curvatures of the upper die and the lower die can be adjusted at least locally; the hot pressing and curving device is used to process a hot pressing and curving process of a flat plastic substrate in the following steps:

adjusting the curvatures of the upper die and the lower die to be flat, and sandwiching the flat plastic substrate between the upper die and the lower die, and using the plurality of the upper heaters and the plurality of the lower heaters to heat the flat plastic substrate to a predetermined temperature, and using the plurality of the upper temperature sensors and the plurality of the lower temperature sensors to sense and monitor the temperature of each area of the flat plastic substrate in order to maintain the temperature of each area of the flat plastic substrate at the predetermined temperature;

adjusting the curvatures of the upper die and the lower die to a first curvature, such that the flat plastic substrate sandwiched between the upper die and the lower die is processed by the upper die and the lower die into the curved plastic substrate with the first curvature; in the meantime, the plurality of the upper temperature sensors and the plurality of the lower temperature sensors continue to sense and monitor that the temperature of each area of the curved plastic substrate with the first curvature is maintained at the predetermined temperature; and adjusting the curvatures of the upper die and the lower die to a second curvature, such that the curved plastic substrate sandwiched between the upper die and the lower die is processed by the upper die and the lower die into the curved plastic substrate with the second curvature; in the meantime, the plurality of the upper temperature sensors and the plurality of the lower temperature sensors continue to sense and monitor that the temperature of each area of the curved plastic substrate with the second curvature is maintained at the predetermined temperature; wherein the second curvature is larger than the first curvature;

wherein the hot pressing and curving device further comprises a plurality of cameras for capturing curvature images of the upper die and the lower die, in order to determine whether the curvature of the curved plastic substrate has reached a predetermined curvature.

2. The processing device of a curved plastic panel of claim 1, wherein:

the upper die at least includes a first upper template, a second upper template and a third upper template; a first upper joint is connected between the first upper template and the second upper template, so that the first upper template can perform a first curvature adjustment movement relative to the second upper template by means of the first upper joint; a second upper joint is connected between the second upper template and the third upper template, so that the third upper template can perform a second curvature adjustment movement relative to the second upper template by means of the second upper joint;

the lower die at least includes a first lower template, a second lower template and a third lower template; a first lower joint is connected between the first lower template and the second lower template, so that the first lower template can perform a third curvature adjustment movement relative to the second lower template by means of the first lower joint; a second lower joint is connected between the second lower template and the third lower template, so that the third lower template can perform a fourth curvature adjustment movement relative to the second lower template by means of the second lower joint;

wherein, the shape and position of the first upper template are corresponding to the first lower template, the shape and position of the second upper template are corresponding to the second lower template, the shape and position of the third upper template are corresponding to the third lower template.

3. The processing device of a curved plastic panel of claim 2, wherein, the plurality of the upper heaters and the plurality of the upper temperature sensors are provided in the first upper template, the second upper template and the third upper template; the plurality of the lower heaters and the plurality of the lower temperature sensors are provided in the first lower template, the second lower template and the third lower template; the first upper joint, the second upper joint, the first lower joint and the second lower joint each includes a linear sliding rail respectively; the curvature between two adjacent said templates is adjusted by a torque driven by the linear sliding rails.

4. The processing device of a curved plastic panel of claim 1, wherein the hot pressing and curving device further comprises:

a driving device for driving the upper die and the lower die in order to perform the hot pressing and curving process;

a heating module, electrically connected to the plurality of the upper heaters and the plurality of the lower heaters, for controlling the heating operations of the plurality of the upper heaters and the plurality of the lower heaters;

a detecting module, further including a temperature sensing module and an image capturing module; the temperature sensing module is electrically connected to the plurality of the upper temperature sensors and the plurality of the lower temperature sensors for obtaining sensed temperature information from the upper temperature sensors and the lower temperature sensors; the image capturing module is electrically connected to the plurality of cameras for capturing the curvature images of the upper die and the lower die captured by the plurality of cameras;

a database for storing at least the data of the predetermined temperature, the first curvature, the second curvature and the predetermined curvature;

an analysis module for receiving the temperature information and the curvature images from the detecting module, and retrieving the data of the predetermined temperature and the first, second and predetermined curvatures from the database; the analysis module can compare the temperature information with the predetermined temperature; when the temperature of the temperature information is lower than the predetermined temperature, the analysis module generates a heating signal to the heating module to actuate the heating module to control the plurality of the upper heaters and the plurality of the lower heaters to heat globally or locally; the analysis module can also compare the curvature images with the predetermined curvature; when the curvature of the curvature image is smaller than the predetermined curvature, the analysis module generates a curvature increase signal to the driving device, so that the driving device drives the upper die and the lower die to perform a hot pressing operation that can increase the curvature globally or locally;

a user interface allowing a user to operate the hot pressing and curving device and also allowing the user to input or set-up various information such as the predetermined temperature and the predetermined curvature in the database; and a control module electrically connecting to and controlling operations of the driving device, the heating module, the detecting module, the database, the analysis module and the user interface.

* * * * *